United States Patent
Mintzlaff

(10) Patent No.: US 9,245,322 B2
(45) Date of Patent: Jan. 26, 2016

(54) METHOD AND ARRANGEMENT FOR SUPPRESSING NOISE IN DIGITAL SIGNAL SEQUENCES AND A CORRESPONDING COMPUTER PROGRAM AND A CORRESPONDING COMPUTER-READABLE STORAGE MEDIUM

(75) Inventor: Rainer Mintzlaff, Reinbek (DE)

(73) Assignee: NXP, B.V., Eindhoven (NL)

( * ) Notice: Subject to any disclaimer, the term of this patent is extended or adjusted under 35 U.S.C. 154(b) by 1542 days.

(21) Appl. No.: 12/063,894

(22) PCT Filed: Aug. 7, 2006

(86) PCT No.: PCT/IB2006/052720
§ 371 (c)(1),
(2), (4) Date: Feb. 15, 2008

(87) PCT Pub. No.: WO2007/020559
PCT Pub. Date: Feb. 22, 2007

(65) Prior Publication Data
US 2008/0235312 A1  Sep. 25, 2008

(30) Foreign Application Priority Data
Aug. 17, 2005 (EP) .................................. 05107576

(51) Int. Cl.
*G06T 5/00* (2006.01)
*G06T 5/50* (2006.01)

(52) U.S. Cl.
CPC . *G06T 5/002* (2013.01); *G06T 5/50* (2013.01); *G06T 2207/10016* (2013.01)

(58) Field of Classification Search
None
See application file for complete search history.

(56) References Cited

U.S. PATENT DOCUMENTS 6,970,268 B1 * 11/2005 Shin et al. ..................... 358/1.9

FOREIGN PATENT DOCUMENTS

WO      0046749 A1    8/2000
WO      0247375 A2    6/2002

OTHER PUBLICATIONS

Paranjape, R. B; et al "Adaptive Neighborhood Mean and Median Image Filtering" Journal of Electronic Imaging, SPIE/IS & T, US, vol. 3, No. 4, Oct. 1, 1994, pp. 360-367.
Song, W-J; et al "Edge-Preserving Noise Filtering Based on Adaptive Windowing" IEEE Transactions on Circuits and Systems, vol. 35, No. 8, Aug. 1988, pp. 1048-1055.

* cited by examiner

Primary Examiner — Michael D Yaary

(57) ABSTRACT

The present invention relates to a method and an arrangement for suppressing noise in digital signal sequences, and to a corresponding computer program and a corresponding computer-readable storage medium, which can be used in particular to smooth and/or improve the signal-to-noise ratio in digital signal processing and in digital image processing. To this end, there is proposed a method for suppressing noise in digital signal sequences, wherein data values $W^0$ of the signal sequence are transformed by evaluating data values $W^i$ from an area around data values $W^0$ to be transformed, characterized in that the number of data values $W^i$ to be evaluated for the transformation of a data value $W^0$ is determined individually for at least some of the data values $W^0$ to be transformed.

8 Claims, 4 Drawing Sheets

FIG. 1-II

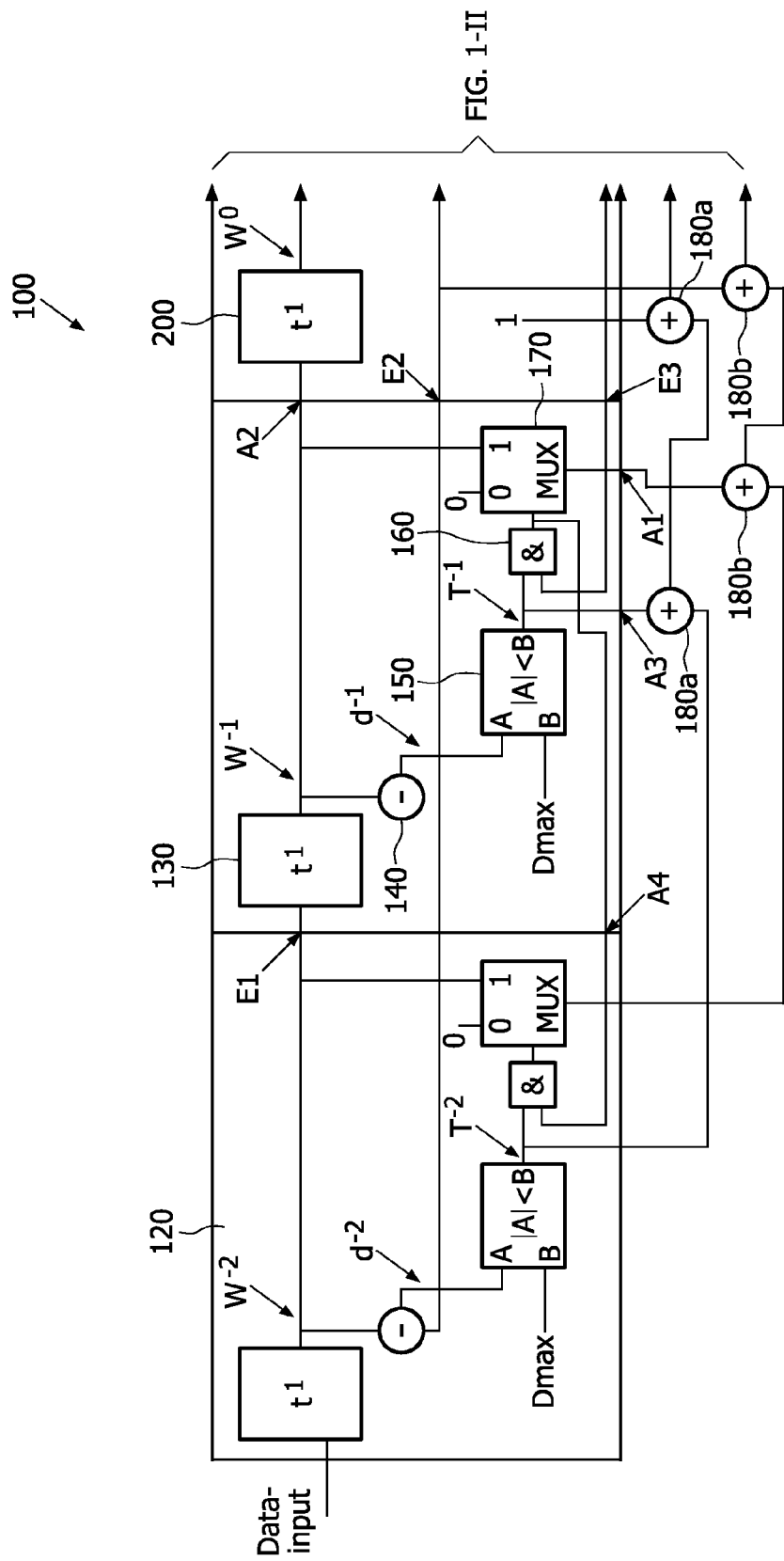
FIG. 1-I

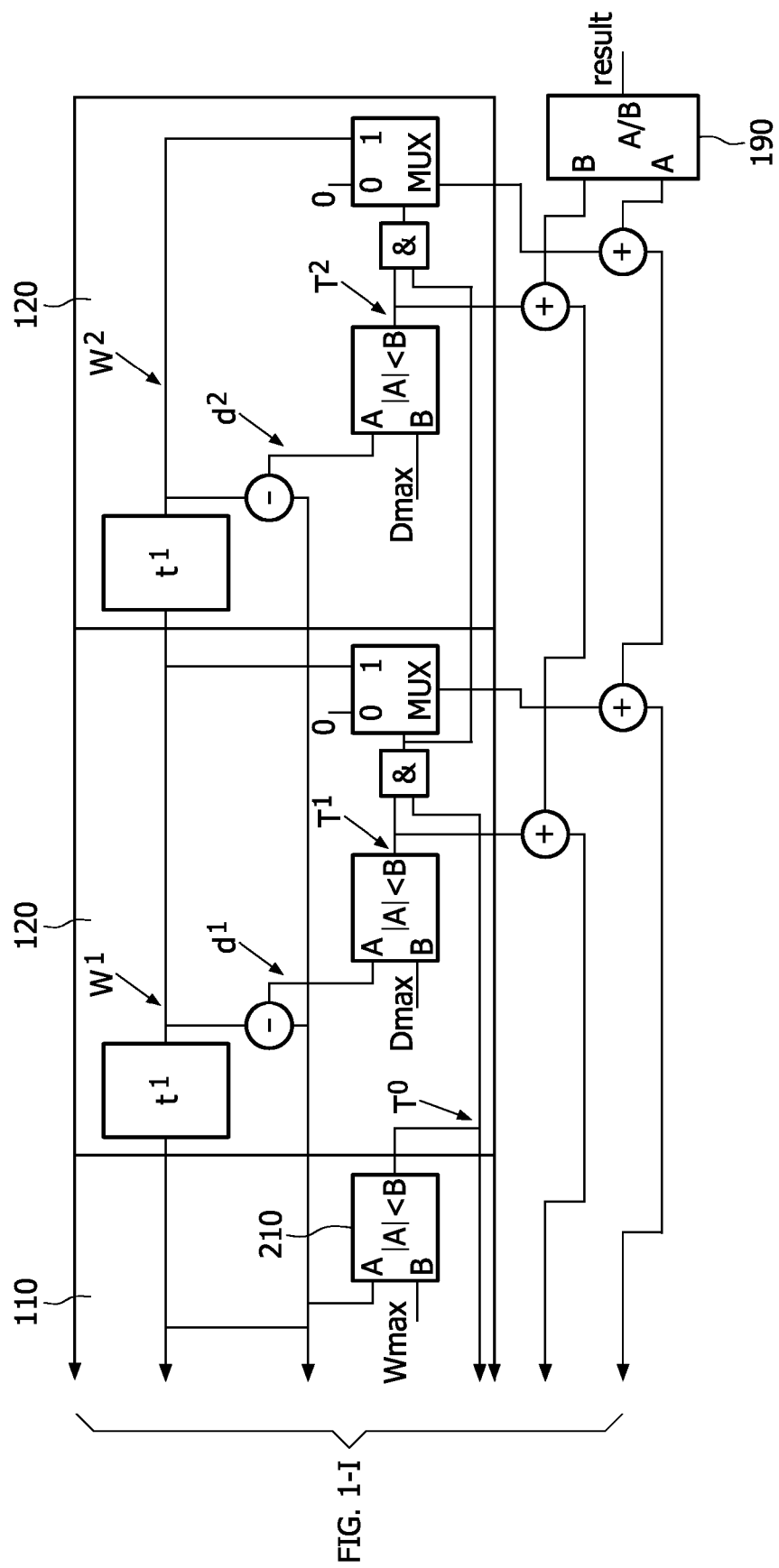
FIG. 1-I
FIG. 1-II

METHOD AND ARRANGEMENT FOR SUPPRESSING NOISE IN DIGITAL SIGNAL SEQUENCES AND A CORRESPONDING COMPUTER PROGRAM AND A CORRESPONDING COMPUTER-READABLE STORAGE MEDIUM

The present invention relates to a method and an arrangement for suppressing noise in digital signal sequences, and to a corresponding computer program and a corresponding computer-readable storage medium, which can be used in particular to smooth and/or improve the signal-to-noise ratio in digital signal processing and in digital image processing.

For digital signal processing and image processing, various methods are already known for the aforementioned purpose. For example, use is made of the sliding mean or the so-called Savitzky-Golay filter. The Savitzky-Golay filter method carries out a local polynomial regression in order to determine the smoothed values for each data point. The required parameters are the order of the polynomial to be adapted and the number of values to be taken into account to the left and to the right of a value to be transformed, that is to say the filter width and position of the filter. There are also solutions in which weights can be predefined for the input data. However, the Savitzky-Golay filter method is carried out with a constant number of input data items. As a result, this method is inflexible. For example, signal sequences with greatly fluctuating properties cannot be treated optimally with this method. A narrow filter for detailed structures of a digital image does not work efficiently in areas of this image which have large-surface textures.

The object of the invention is therefore to provide a method and an arrangement for suppressing noise in digital signal sequences, and also a corresponding computer program and a corresponding computer-readable storage medium, which eliminate the aforementioned disadvantages and in particular permit a flexible, context-based adaptation of the filter width of a filter used for noise suppression.

One particular advantage of the method according to the invention is that the number of data values taken into account for noise suppression is variable. This is achieved in that, in the method for suppressing noise, data values $W^0$ of the signal sequence are transformed by evaluating data values $W^i$ from an area around data values $W^0$ to be transformed, and the number of data values $W^i$ to be evaluated for the transformation of a data value $W^0$ is determined individually for at least some of the data values $W^0$ to be transformed. Advantageously, the determination of the number of data values $W^i$ to be evaluated takes place during the method and for all the data values of the signal sequence. However, it may prove to be useful in certain applications for the determination of the number of data values $W^i$ to be evaluated to take place offline before carrying out noise suppression or to be carried out only for some of the data values of the signal sequence.

Another advantage of the method according to the invention is that, when using this method, there is no need for weighting of the input data since the number of input data items in the proposed method is variable depending on the difference thereof from the actual input value to be transformed and from its temporal or geographical proximity.

In one preferred embodiment of the method according to the invention, it is provided that, for a data value $W^0$ of the signal sequence which is to be transformed and belongs to a point in time $t^0$, at most m=1 data values $W^i$ for previous points in time $t^i$ (i=1, ..., m-1, m) and/or at most n=1 data values for subsequent points in time $t^j$ (=-n, -(n-1), -1) are evaluated, according to the following rule:

successive determination, for previous data values $W^1$ to at most $W^m$, of the difference between the data value $W^i$ to be evaluated and the data value $W^0$ to be transformed and the taking into account of the value $W^i$ for noise suppression if the absolute value of the difference is less than or equal to a first predefinable value, and otherwise termination of the test in respect of previous data values, and/or successive determination, for subsequent data values $W^{-1}$ to at most $W^{-n}$, of the difference between the data value $W^j$ to be evaluated and the data value $W^0$ to be transformed and the taking into account of the value $W^j$ for noise suppression if the absolute value of the difference is less than or equal to a second predefinable value, and otherwise termination of the test in respect of subsequent data values, determination of the result value for the point in time $t^0$ using the data values to be taken into account for noise suppression.

It proves to be particularly advantageous, especially for a symmetrical design of a circuit of a corresponding noise filter, if the number m of the maximum number of data values $W^i$ of previous points in time $t^i$ to be evaluated is equal to the number n of the maximum number of data values $W^j$ of subsequent points in time $t^j$ to be evaluated. It is moreover advantageous if the signal sequence is sampled equidistantly.

In another preferred embodiment of the method according to the invention, it is provided that, prior to the start of the successive determination of the difference between previous and/or subsequent data values $W^i$ and the data value $W^0$ to be transformed, the data value $W^0$ to be transformed is compared with a third predefinable value, and the determination of the differences is started if the data value $W^0$ to be transformed is less than or equal to the third predefinable value. By virtue of this preceding test, the processing time of noise suppression is influenced by defining the third predefinable value $W^{max}$, so that the time taken for signal processing is in some cases considerably shortened. By way of example, the image processing can be restricted to dark areas by suitably predefining the third value $W^{max}$.

Another preferred embodiment of the method according to the invention provides that the cut-off frequency of the low-pass filter formed by the implementation of a method is determined by defining the maximum number of data values to be taken into account.

It is furthermore provided that—as an alternative or in addition to determining the cut-off frequency by predefining the maximum number of data values to be taken into account—the extent of the noise components to be suppressed is determined by defining the maximum permissible difference between the data value $W^i$ to be evaluated and the data value $W^0$ to be transformed. It may prove to be advantageous here if, for different points in time $t^i$, different maximum permissible differences between the data value $W^i$ to be evaluated and the data value $W^0$ to be transformed are defined.

For the case where the signal sequences are sequences of pixels, in one preferred embodiment of the method according to the invention the noise suppression is effected by a method being carried out row by row and/or column by column.

An arrangement according to the invention is characterized in that the arrangement comprises at least one chip and/or processor which is/are designed in such a way that a method for suppressing noise in digital signal sequences can be carried out, wherein data values $W^0$ of the signal sequence are transformed by evaluating data values $W^i$ from an area around data values $W^0$ to be transformed and the number of data values $W^i$ to be evaluated for the transformation of a data value $W^0$ is determined individually for at least some of the data values $W^0$ to be transformed.

One preferred embodiment of the arrangement according to the invention provides that the arrangement is designed in such a way that the following can be carried out: for a data value $W^0$ of the signal sequence which is to be transformed and belongs to a point in time $t^0$, at most m=1 data values $W^i$ for previous points in time $t^i$ (i=1, ..., m−1, m) and/or at most n=1 data values for subsequent points in time $t^j$ (j=−n, −(n−1), ..., −1) are evaluated, according to the following rule:

successive determination, for previous data values $W^1$ to at most $W^m$, of the difference between the data value $W^i$ to be evaluated and the data value $W^0$ to be transformed and the taking into account of the value $W^i$ for noise suppression if the absolute value of the difference is less than or equal to a first predefinable value, and otherwise termination of the test in respect of previous data values, and/or successive determination, for subsequent data values $W^1$ to at most $W^m$, of the difference between the data value $W^i$ to be evaluated and the data value $W^0$ to be transformed and the taking into account of the value $W^i$ for noise suppression if the absolute value of the difference is less than or equal to a second predefinable value, and otherwise termination of the test in respect of subsequent data values, determination of the result value for the point in time $t^0$ using the data values to be taken into account for noise suppression.

In another preferred embodiment of the arrangement according to the invention, it is provided that the arrangement comprises the following:

a comparison unit 110 for comparing the data value $W^0$ to be transformed with a predefinable maximum value $W^{max}$ and m+n evaluation units 120 for determining whether a data value $W^i$ to be evaluated is to be taken into account for noise suppression.

Preferably, the evaluation units 120 are in each case designed in such a way that a comparison of a predefinable comparison value $D^{max-i}$ with the absolute value $|W^0-W^i|$ of the difference between a data value $W^i$ to be evaluated and the data value $W^0$ to be transformed can be carried out, and, depending on the result of this comparison and a value which contains information about the previous tests, the data value $W^i$ is output as a data value to be taken into account for noise suppression.

In one specific embodiment of the arrangement according to the invention, it is provided that the evaluation unit 120 comprises at least a register 130,
a subtractor 140,
a comparator 150,
an AND gate 160, and
a multiplexer 170,
wherein
a first data input E1 of the evaluation unit 120 is connected to the data input of the register 130, one data input of the subtractor 140 is connected to a second data input E2 of the evaluation unit 120 and one data input of the subtractor 140 is connected to the output of the register 130, one data input of the comparator 150 is connected to the data output of the subtractor 140 and one data input of the comparator 150 is fed a comparison value $D^{max-i}$, one data input of the AND gate 160 is connected to the data output of the comparator 150 and one data input of the AND gate 160 is connected to a third data input E3 of the evaluation unit 120, one data input of the multiplexer 170 is connected to the data output of the AND gate 160, one data input of the multiplexer 170 is connected to the data output of the register 130, one data input of the multiplexer 170 is fed the value zero, and the data output of the multiplexer 170 is connected to a first data output A1 of the evaluation unit 120, and the data output of the register 130 is additionally connected to a second data output A2 of the evaluation unit 120 and the data output of the comparator 150 is additionally connected to a third data output A3 of the evaluation unit 120.

Particularly for the evaluation units 120 assigned to the points in time $t^{-(n-1)}, t^{-(n-2)}, \ldots, t^2, t^1, t^2, \ldots, t^{m-1}$, it proves to be advantageous if the data output of the AND gate 160 is additionally connected to a fourth data output A4 of the evaluation unit 120.

In another preferred embodiment of the arrangement according to the invention, it is provided that the comparison unit 110 comprises a register 200 and a comparator 210, wherein the data input of the register 200 is connected to a first data input of the comparator 210 and a second data input of the comparator 210 is fed a comparison value $W^{max}$.

Another preferred embodiment of the arrangement according to the invention provides that the comparison unit 110 and the m+n evaluation units 120 are connected to one another in such a way that, for i=1, 2, ..., m−1, the data outputs A2 and A4 of the evaluation unit 120 for the point in time $t^i$ are respectively connected to the data inputs E1 and E3 of the evaluation unit 120 for the point in time $t^{i+1}$, for j=−(n−1), −(n−2), ..., −1, the data input E1 and the data output A4 of the evaluation unit 120 for the point in time $t^j$ are respectively connected to the data output A2 and the data input E3 of the evaluation unit 120 for the point in time $t^{j-1}$, and the data inputs E1 and E3 of the evaluation unit 120 for the point in time $t^1$ are respectively connected to the data outputs of the register 200 and of the comparator 210 of the comparison unit 110, the data input E3 and the data output A2 of the evaluation unit 120 for the point in time $t^{-1}$ are respectively connected to the data output of the comparator 210 and to the data input of the register 200 of the comparison unit 110, and the data inputs of all the m+n evaluation units 120 are connected to the data output of the register 200 of the comparison unit 110. A circuit arrangement designed in this way ensures that a coherent range of data values before and after a data value $W^0$ to be transformed is taken into account for the transformation thereof.

In yet another preferred embodiment of the arrangement according to the invention, it is provided that the arrangement comprises 2*(m+n) adders 180a, 180b, wherein in each case two adders 180a, 180b are assigned to one of the m+n−1 evaluation units 120 for the points in time $t^{-(n-1)}$, $t^{-(n-2)}, \ldots, t^2, t^1, t^2, \ldots, t^m$ in such a way that the data output A3 of the evaluation unit 120 which is connected to the data output of the comparator 150 is connected to a first data input of the first adder 180a and the data output A1 of the evaluation unit 120 which is connected to the data output of the multiplexer is connected to a first data input of the second adder 180b, two adders 180a, 180b are assigned to the unit 110 for comparing the data value $W^0$ to be transformed with a predefinable maximum value $W^{max}$ in such a way that a first data input of the first adder 180a is fed the value 1 and a first data input of the second adder 180b is fed the value $W^0$, the adders 180*a* which are connected to the outputs A3 of the evaluation unit 120 and the adder 180*a* which is fed the value 1 are connected to one another in such a way that a second data input of an adder 180*a* assigned to the point in time $t^i$ is connected to the data output of the evaluation unit for the point in time $t^{i-1}$ (i=−(n−2), −(n−3), ..., m) and a second data input of the adder 180*a* assigned to the point in time $t^{-(n-1)}$ is connected to the data output A3 of the evaluation unit 120 for the point in time $t^{-n}$, and the adders 180*b* which are connected to the outputs A1 of the evaluation unit 120 and the adder 180*b* which is fed the value $W^0$ are connected to one another in such a way that a second data input of an adder 180*a*, 180*b* assigned to the point in time $t^i$ is connected to the data output of the evaluation unit for the point in time $t^{i-1}$ (i=−(n−2), −(n−3), ..., m) and a second data input of the adder 180*a* assigned to the point in time $t^{-(n-1)}$ is connected to the data output A1 of the evaluation unit 120 for the point in time $t^{-n}$.

In a preferred embodiment of the method for noise suppression according to the invention, it is provided that the determination of the result value for the point in time $t^0$ comprises the calculation of the arithmetic mean $$\left(\sum_{i=1}^{k} W^i\right) / k,$$

wherein k is the number of data values $W^i$ determined as having to be taken into account. To this end, use is advantageously made of an arrangement which comprises a divider 190, wherein the dividend data input of the divider 190 is connected to the data output of the adder 180*b* connected to the data output A1 of the evaluation unit 120 for the point in time $t^m$ and the divisor data input of the divider 190 is connected to the data output of the adder 180*a* connected to the data output A3 of the evaluation unit 120 for the point in time $t^m$.

Under certain circumstances, it may prove to be advantageous to carry out noise suppression using a computer program. A computer program for noise suppression according to the invention makes it possible for a computer to carry out a method for suppressing noise in digital signal sequences, after said method has been loaded into the memory of the computer, wherein data values $W^0$ of the signal sequence are transformed by evaluating data values $W^i$ from an area around data values $W^0$ to be transformed, and the number of data values $W^i$ to be evaluated for the transformation of a data value $W^0$ is determined individually for at least some of the data values $W^0$ to be transformed.

By way of example, these computer programs can be downloaded to a data or communication network (for a fee or at no cost, in a freely accessible or password-protected manner). The computer programs thus provided can then be used by a method in which a computer program as claimed in claim 22 is downloaded from an electronic data network, such as from the Internet for example, onto a data processing device connected to the data network.

For distribution of the computer program according to the invention, use is advantageously made of a computer-readable storage medium on which a program is stored which makes it possible for a computer to carry out a method for suppressing noise in digital signal sequences, after said method has been loaded into the memory of the computer, wherein data values $W^0$ of the signal sequence are transformed by evaluating data values $W^i$ from an area around data values $W^0$ to be transformed, and the number of data values $W^i$ to be evaluated for the transformation of a data value $W^0$ is determined individually for at least some of the data values $W^0$ to be transformed.

The invention will be further described with reference to an example of embodiment shown in the drawings to which, however, the invention is not restricted.

FIG. 1 shows an example of a circuit of a noise filter from the point in time $t^{-2}$ to the point in time $t^2$.

Figure 2:
FIG. 2 shows an example of an unfiltered image detail.
Figure 3:
FIG. 3 shows the same image detail following processing by a filter comprising a chain of 41 registers.

In the text which follows, the invention will be explained in more detail and by way of example with reference to the particular case of using a noise filter for a time-based input signal (cf. FIG. 1). It should be taken into account that the invention is not restricted to the example of embodiment described in the following text, but rather the method and the arrangement can also be used for noise suppression in location-based image data by processing the data signal pixel by pixel.

Starting from the value to be transformed of an equidistantly sampled data flux at the point in time $t^0$, the previous data from the points in time $t^1, t^2, t^3, t^4, \ldots$ etc. and the values coming after the point in time $t^0$ at the points in time $t^{-1}, t^{-2}, t^{-3}, t^{-4}, \ldots$ etc. are used together with the actual value to be transformed in order to smooth the signal (e.g. by forming the arithmetic mean).

Detection of the noise components takes place, again by way of example, via correlation with the following three parameters.

1. The maximum number of successive data values ($N^{max}$) to be taken into account before and after the data value to be transformed determines the cut-off frequency of the resulting low-pass filter.

2. The maximum permissible difference ($D^{max-i}$), assigned to the points in time $t^{-Nmax} \ldots t^{-2}, t^{-1}, t^1, t^2 \ldots t^{Nmax}$, between the data value to be transformed and the data value available for correlation as the extent of the noise components to be suppressed.

3. The maximum permissible value ($W^{max}$) of the data value to be transformed for shortening the processing time.

The mode of operation, in principle, for the noise suppression shown by way of example can be described as follows:

Starting from the data value at the point in time $t^0$, when this is less than $W^{max}$, the data values at the points in time $t^1$ to $t^{Nmax}$ are successively checked to ascertain whether the value lies within the deviation $D^{max-n}$. If this is the case, this value is used to smooth the signal; otherwise, the correlation is terminated.

This procedure is repeated for the data values $t^{-1}$ to $t^{-Nmax}$.

Using the data values obtained from the two correlations, the result value for $t^0$ is determined.

In image processing, the same possibility for noise suppression exists by applying the method according to the invention in the row and column direction starting from the current pixel.

In the text which follows, the mode of operation will be described in greater detail based on the example of a noise filter 100 with five registers 130 (cf. in this respect the circuit in FIG. 1):

Starting from the data input, the digital signal is looped through the five registers 130 connected one behind the other, as a result of which the data signal, after each register 130 ($t^{-2}$ to $t^2$), progresses by in each case one cycle (time-based input signal) or one pixel (location-based data of an image).

At each point in time, there is calculated in the noise filter 100 an output value which projects an equivalent result for the current value $W^0$ (at the point in time $t^0$) of the middle register 130 (point in time $t^0$).

This calculation of the output value is effected in accordance with the following algorithm:

From the values $W^{-2}$, $W^{-1}$, and $W^1$, $W^2$ belonging to the points in time $t^{-2}$, $t^{-1}$, and $t^1$, $t^2$, the differences ($d^{-2}$, $d^{-1}$, $d^1$, $d^2$) from the value $W^0$ are formed by means of subtractors 140. If the effectiveness of this noise filter 100 is to extend only to a partial range of signal amplitudes (possibly useful when limiting the noise filter 100 to dark areas in image processing), once the value $W^{max}$ has been exceeded by $W^0$ no further data value is taken into account for the result. In order to achieve this in terms of circuit technology, use is made of a unit 110 for comparing the data value $W^0$ to be transformed with a predefinable maximum value $W^{max}$, the output value of said unit 110 then being passed as input value to the evaluation units 120, in which it is determined whether a data value $W^i$ to be evaluated is to be taken into account for the noise suppression. Moreover, in each case, the value $T^0$ which serves as a counter for the data values taken into account when calculating the result value is set to be equal to one ($T^0=1$). The differences $d^{-2}$, $d^{-1}$, $d^1$, $d^2$ previously calculated by the subtractors 140 in the evaluation units 120 are compared as the absolute value with an (optionally different) maximum permitted difference value $D^{max-i}$. To this end, each evaluation unit 120 comprises a comparator 150.

When, starting from $T^0$, this criterion is satisfied ($T^1$ or $T^{-1}=1$), the data values $W^1$ and $W^{t-1}$ (for the points in time $t^1$ and $t^{-1}$) are added to the value $W^0$ using the adder 180b. Using the appropriate criteria, this is also effected with the subsequent values (here at most $W^2$ or $W^{-2}$) until the procedure is terminated on account of the differences (here at most $d^{-2}$ or $d^2$) being exceeded. At the same time, the number of data values used for the calculation is added by the adders 180a.

Usually (more than five registers 130), this termination criterion is checked in circuit technology terms by an AND gate 160, which receives as input values the result $T^i$ of the comparator 150 and a value which indicates whether the corresponding criteria for the data values between the current data value $W^i$ to be evaluated and the data value $W^0$ to be transformed is satisfied. Division of the sum of the data values by the number of data values, that is to say the arithmetic mean of the input data used, forms the result value as output signal. Instead of the arithmetic mean, it is of course also possible to use other suitable formulae.

The invention is not restricted in terms of its embodiment to the preferred example of embodiment mentioned above. Rather, a number of variants are conceivable which make use of the device according to the invention and the method according to the invention even in embodiments which are in principle of different type.

LIST OF REFERENCES 100 noise filter
110 comparison unit
120 evaluation unit
130 register
140 subtractor
150 comparator
160 AND gate
170 multiplexer
180a adder
180b adder
190 divider
200 register
210 comparator

The invention claimed is:

1. An arrangement comprising
at least one chip or processor which is designed in such a way that a method for suppressing noise in digital signal sequences can be carried out,
wherein data values $W^0$ of the signal sequence are transformed by evaluating data values $W^i$ from an area around data value $W^0$ in the sequence, and
the number of data values $W^i$ to be evaluated for the transformation of a data value $W^0$ is determined individually for at least some of the data values $W^0$ to be transformed;
wherein the arrangement is designed in such a way that the following can be carried out:
for a data value $W^0$ of the signal sequence which is to be transformed and belongs to a point in time $t^0$, at most m data values $W^i$ for previous points in time $t^i$ (i=1, ..., m−1, m) and/or at most n data values for subsequent points in time $t^j$ (j=−n, −(n−1), ..., −1) are evaluated, according to the following rule:
successive determination, for previous data values $W^1$ to at most $W^m$, of the difference between the data value $W^i$ to be evaluated and the data value $W^0$ to be transformed and the taking into account of the value $W^i$ for noise suppression if the absolute value of the difference is less than or equal to a first predefinable value, and otherwise termination of the test in respect of previous data values, and/or
successive determination, for subsequent data values $W^{-1}$ to at most $W^{-n}$, of the difference between the data value $W^j$ to be evaluated and the data value $W^0$ to be transformed and the taking into account of the value $W^j$ for noise suppression if the absolute value of the difference is less than or equal to a second predefinable value, and otherwise termination of the test in respect of subsequent data values,
determination of the result value for the point in time $t^0$ using the data values to be taken into account for noise suppression.

2. An arrangement, comprising
at least one chip or processor which is designed in such a way that a method for suppressing noise in digital signal sequences can be carried out,
wherein data values $W^0$ of the signal sequence are transformed by evaluating data values $W^i$ from an area around data value $W^0$ in the sequence, and
the number of data values $W^i$ to be evaluated for the transformation of a data value $W^0$ is determined individually for at least some of the data values $W^0$ to be transformed; and
a comparison unit for comparing the data value $W^0$ to be transformed with a predefinable maximum value $W^{max}$ and
m+n evaluation units for determining whether a data value $W^i$ to be evaluated is to be taken into account for noise suppression;
characterized in that the evaluation unit comprises at least
a register,
a subtractor,
a comparator,
an AND gate, and
a multiplexer,
wherein
a first data input E1 of the evaluation unit is connected to the data input of the register, one data input of the subtractor is connected to a second data input E2 of the evaluation unit and one data input of the subtractor is connected to the output of the register, one data input of the comparator is connected to the data output of the subtractor and one data input of the comparator is fed a comparison value $D^{max\_i}$, one data input of the AND gate is connected to the data output of the comparator and one data input of the AND gate is connected to a third data input E3 of the evaluation unit, one data input of the multiplexer is connected to the data output of the AND gate, one data input of the multiplexer is connected to the data output of the register, one data input of the multiplexer is fed the value zero, and the data output of the multiplexer is connected to a first data output A1 of the evaluation unit, and the data output of the register is additionally connected to a second data output A2 of the evaluation unit and the data output of the comparator is additionally connected to a third data output A3 of the evaluation unit.

3. An arrangement as claimed in claim 2, characterized in that the evaluation units are in each case designed in such a way that a comparison of a predefinable comparison value $D^{max\_i}$ with the absolute value $|W^0-W^i|$ of the difference between a data value $W^i$ to be evaluated and the data value $W^0$ to be transformed can be carried out, and, depending on the result of this comparison and a value which contains information about the previous tests, the data value $W^i$ is output as a data value to be taken into account for noise suppression.

4. An arrangement as claimed in claim 2, characterized in that the data output of the AND gate is additionally connected to a fourth data output A4 of the evaluation unit.

5. An arrangement as claimed in claim 2, characterized in that the comparison unit comprises a register and a comparator, wherein the data input of the register is connected to a first data input of the comparator and a second data input of the comparator is fed a comparison value $W^{max}$.

6. An arrangement as claimed in claim 2, characterized in that the comparison unit and the m+n evaluation units are connected to one another in such a way that, for i=1, 2, . . . , m−1, the data outputs A2 and A4 of the evaluation unit for the point in time $t^i$ are respectively connected to the data inputs E1 and E3 of the evaluation unit for the point in time $t^{i+1}$, for j=−(n−1), −(n−2), . . . , −1, the data input E1 and the data output A4 of the evaluation unit for the point in time $t^i$ are respectively connected to the data output A2 and the data input E3 of the evaluation unit for the point in time $t^{i-1}$, and the data inputs E1 and E3 of the evaluation unit for the point in time $t^1$ are respectively connected to the data outputs of the register and of the comparator of the comparison unit, the data input E3 and the data output A2 of the evaluation unit for the point in time $t^{-1}$ are respectively connected to the data output of the comparator and to the data input of the register of the comparison unit, and the data inputs of all the m+n evaluation units are connected to the data output of the register of the comparison unit.

7. An arrangement as claimed in claim 2, characterized in that the arrangement comprises 2*(m+n) adders, wherein in each case two adders are assigned to one of the m+n−1 evaluation units for the points in time $t^{-(n-1)}, t^{-(n-2)}, \ldots, t^2, t^1, t^2, \ldots, t^m$ in such a way that the data output A3 of the evaluation unit which is connected to the data output of the comparator is connected to a first data input of the first adder and the data output A1 of the evaluation unit which is connected to the data output of the multiplexer is connected to a first data input of the second adder, two adders are assigned to the unit for comparing the data value $W^0$ to be transformed with a predefinable maximum value $W^{max}$ in such a way that a first data input of the first adder is fed the value 1 and a first data input of the second adder is fed the value $W^0$, the adders which are connected to the outputs A3 of the evaluation unit and the adder which is fed the value 1 are connected to one another in such a way that a second data input of an adder assigned to the point in time $t^i$ is connected to the data output of the evaluation unit for the point in time $t^{i-1}$ (i=−(n−2), −(n−3), . . . , m) and a second data input of the adder assigned to the point in time $t^{-(n-1)}$ is connected to the data output A3 of the evaluation unit for the point in time $t^{-n}$, and the adders which are connected to the outputs A1 of the evaluation unit and the adder which is fed the value $W^0$ are connected to one another in such a way that a second data input of an adder assigned to the point in time $t^i$ is connected to the data output of the evaluation unit for the point in time $t^{i-1}$ (i=−(n−2), −(n−3), . . . , m) and a second data input of the adder assigned to the point in time $t^{-(n-1)}$ is connected to the data output A1 of the evaluation unit for the point in time $t^{-n}$.

8. An arrangement as claimed in claim 7, characterized in that the arrangement comprises a divider, wherein the dividend data input of the divider is connected to the data output of the adder connected to the data output A1 of the evaluation unit for the point in time $t^m$ and the divisor data input of the divider is connected to the data output of the adder connected to the data output A3 of the evaluation unit for the point in time $t^m$.

* * * * *